United States Patent Office 3,257,615
Patented June 21, 1966

3,257,615
HIGH IMPEDANCE SEMICONDUCTOR AMPLIFIER
AND MEASURING INSTRUMENT
Stephen A. Slenker, River Edge Road N., Billerica, Mass.
Filed Dec. 12, 1961, Ser. No. 158,772
3 Claims. (Cl. 324—123)

The present invention pertains to improvements in measuring instruments by the use of semiconductor devices in novel circuitry to provide much greater range, higher sensitivity, higher impedance, and lower current drain as well as greater accuracy than is presently possible by using conventional techniques.

The principal object of the invention is to provide a high impedance voltmeter which will measure voltage at a high impedance level of over 100,000 megohms and drive a standard meter movement so that the device will provide accurate measurement of voltages at these impedance levels.

Another object of the invention is to provide a semiconductor measuring instrument with an exceptionally high degree of linearity and constant input impedance by the use of quasi-infinite impedance, constant current sources to resstrict the load current to an extremely the beta versus collector current variation encountered in conventional semiconductor circuitry.

Another object of the invention is to provide a semiconductor impedance transfer device with nearly constant current output and constant collector to emitter voltage on at least the initial stages, irrespective of the input voltage, thereby maintaining a constant value of collector leakage current over the entire dynamic operating range of the instrument.

Generally the device permits an improvement in multirange electronic meters of over four orders of magnitude as to sensitivity and input impedance while decreasing the power drain and reducing the overall size of the instrument.

The objects and features of this device will become more apparant from the detailed description of the drawings in which.

Figure 1:
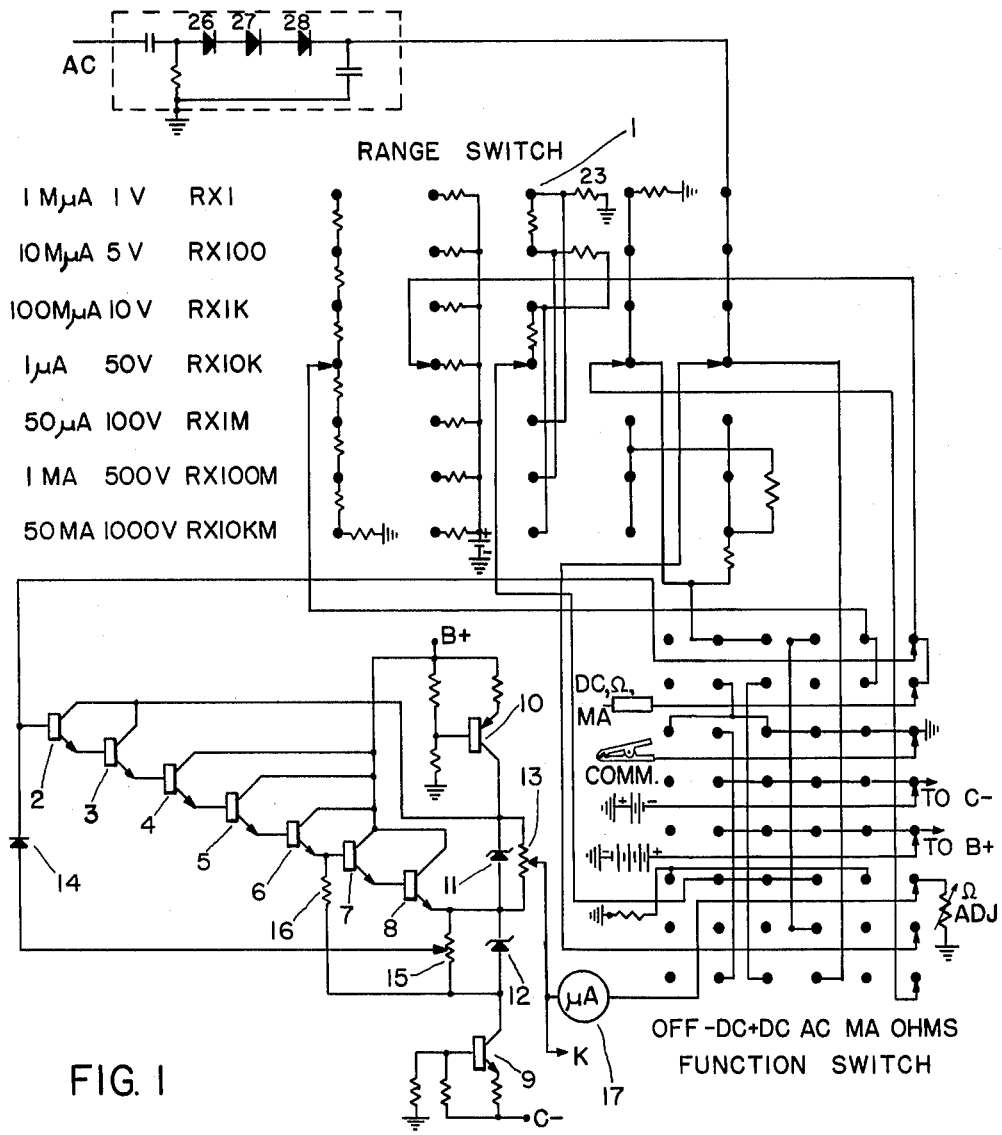
FIGURE 1 is the basic instrument incorporated into an electronic multimeter.

Referring now to FIGURE 1, the operation of the basic voltmeter circuit can be understood best by describing the sequential signal flow through the circuit when the range switch is positioned at the fifty volt range as shown in FIGURE 1, and the function switch is shifted from the "ohms" position shown in FIGURE 1 to the "+DC" position. When the range switch is positioned as shown, meter 17 is connected through resistor 23 to ground. When the function switch is moved to the "+DC" position, the DC probe is connected to the base of transistor 2 of the electrical measuring instrument illustrated in the lower-left-hand portion of FIGURE 1. Such instrument comprises, in addition to input transistors 2 and 3, a string of transistors 4, 5, 6, 7, and 8 having a composite connection therebetween. That is to say, the emitter of a preceding transistor is directly connected to the base of the succeeding transistor. A source of bias voltage, B+, is connected to the collector electrode of each transistor of the string.

There is also a composite connection between input transistors 2 and 3, and the emitter of transistor 3 is directly connected to the base of transistor 4, the first transistor of the string. The collectors of the two input transistors are each connected to the emitter of the transistor 8, the last of the string, through Zener diode 11, which as will be seen later acts as a source of reference voltage when transistors 9 and 10, connected by diode 11 in complementary symmetry, are active. The polarity of the source of reference voltage is such as to reverse bias the collector-base junctions of input transistors 2 and 3.

The electrical load for the string of transistors is constituted essentially by resistance 23 which is connected to the emitter of transistor 8 through meter 17 and adjustable resistance 13, the latter shunting diode 11 and providing a zero adjustment for the meter when there is no input signal applied to the base of input transistor 2. The impedance level is decreased by a small amount by the active operation of transistor 2 but due to the extremely low current levels involved in this stage, the impedance level is only decreased by a factor of two to five as is determined by the beta versus collector current characteristics of the transistor.

The transistor 3 provides additional impedance transfer in the same fashion as transistor 2, but the current levels are somewhat greater in this stage and more gain is realized than in the previous stage due to the increased beta at the higher current level. The transistors 4 and 5 are conventional emitter followers which are able to work on the higher current level supplied by transistors 2 and 3. Transistors 7 and 8 are conventional emitter followers. Transistors 9 and 10 are constant current sources, used to maintain a fixed value of current through the Zener diode 11 and Zener diode 12.

The voltage at the cathode of the Zener diode 11 is fed back to the collector of transistors 2 and 3 to provide a substantially fixed value of collector to base voltage on these transistors irrespective of input voltage thereby limiting the leakage current on these transistors to a fixed small value. Since the base to emitter voltage of a transistor is known to be a constant value, the Zener reference diode 11 obviously provides a constant voltage reference from collector to emitter of the emitter follower 2 as well as providing the same constant reference for the emitter follower 3. Zener diode 12 is used to provide a constant current bias to the input of transistor 7 through a large resistor 16, so as to stabilize the circuit by providing a current bias larger than the leakage current. The current bias so provided is such that the value of current through transistors 7 and 8 is maintained substantially constant.

The output of the device is taken from the potentiometer 13 across the Zener diode 11 and drives a high resistance 23 in series with a micro-ammeter 17. The value of resistance in series with the micro-ammeter is chosen so that the value of current in the meter 17 is small compared to the value of current in the potentiometer 13 which is adjusted to compensate for the voltage drops occurring in transistors 2 through 8, thereby providing meter zero control.

Since the currents in the transistors 9 and 10 are constant, the current in the Zener diode is constant and the only variation in the output current is due to the meter which can draw only a small percentage of the current being drawn by the transistors 9 and 10. The current being drawn by the meter and transistor 9, less the current being drawn by transistor 10 equals the value of the load current. Since the meter current is the only current variation in the load current, and the meter current is a small percentage of the load the transistor 8 has a small value of load current variation. The small load current variation is reflected backwards into transistors 6, 5, 4, 3, and 2 respectively. Since the Zener diode supply 12 acting through the resistor 16 is a high impedance constant current source, this supply reflects no current variation into the emitter follower string but acts as a quiescent load for the string.

By maintaining a nearly constant current throughout the entire emitter follower string, it is possible to control the impedance level to a finite determinable value which is dependent upon the value of current drawn from the voltage under test and the value of voltage under test. The use of new transistor types such as the surface passivated devices which have extremely low leakage currents and extremely flat beta versus collector current characteristics permits the input currents to have extremely low values. By the use of transistor constant current sources in approximate places in the impedance transfer circuitry so as to drastically reduce the percentage of current variation, it is possible to accomplish extremely high linearity. Also, since beta and the useful current to leakage ratio are maintained constant, the variation in circuit gain and transfer impedance are maintained constant.

An additional leakage compensating device 14 may be optionally inserted into the circuit so as to supply the input leakage current of the circuit internally and further increase the input impedance as well as providing for a leakage current tracking with variations in temperature. Leakage current-tracking with variations in temperature is achieved by selecting for device 14, a semiconductor diode which has substantially the same temperature response characteristic as the collector-base diode junction of transistor 2. The leakage current may be nulled by means of the leakage potentiometer 15 as any setting of the leakage will yield only a static voltage difference across the diode 14.

The various voltage ranges of the instrument are obtained by switching in the proper voltage dividers in the input circuitry and the proper values of resistors in series with the meter movement.

Figure 2:
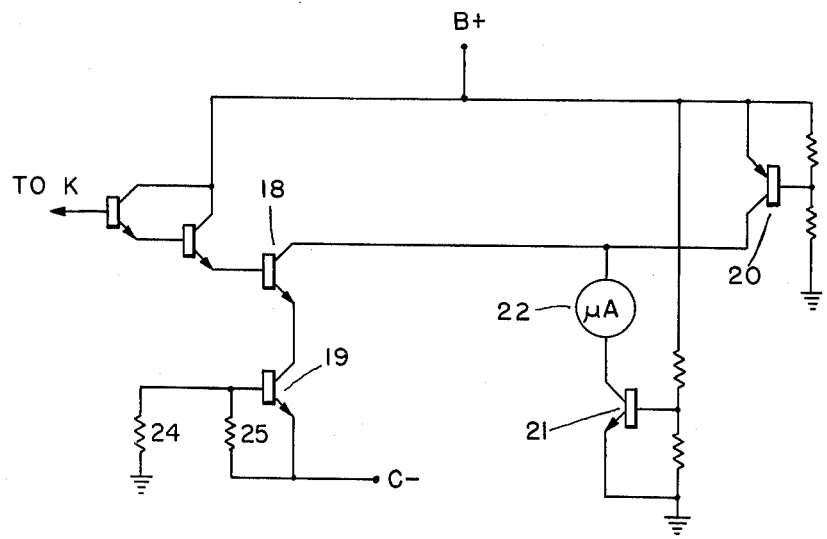
FIGURE 2 is an accessory circuit which extends the range of the instrument to permit the reading of extremely low values of voltage and current.

FIGURE 2 shows an accessory equipment capable of extending the ranges of the instrument to read even lower values of voltages and currents when the input of FIGURE 2 is connected to point K of FIGURE 1, and the B+ in the two figures are connected together. The first two stages of this accessory are emitter followers and the transistor 18 is a current and voltage amplifier of relatively constant current output designed to give meter protection without departing from the philosophy of keeping the voltage and current changes across the device small. Transistor 19 is a meter protection device which prevents the flow of excess current through transistor 18. Ordinarily, transistor 19 operates in a saturated mode, thereby reflecting its low saturation resistance characteristic into the emitter of transistor 18. The base biasing network 24 and 25 of transistor 19 is set up so that when an excessive current is required by transistor 18, transistor 19 will switch into its unsaturated, current limiting mode or linear operating region where it presents a current source to transistor 18. This self switching action of 19 prevents burnout of transistor 18 under overload. When the voltage at the collector of transistor 18 would permit an overload current to flow through the meter 22, transistor 21 self switches into a safety region, thereby protecting the meter 22 in an analogous fashion as transistor 19 protected transistor 18. Transistor 20 draws a constant current at infinite impedance, thereby maintaining a high static to dynamic impedance ration and a high efficiency.

In FIGURE 1, diodes 26, 27, and 28 are shown in series in an AC probe. This probe may be conventional in nature and is coupled to the base of transistor 2 when the function switch is moved from its "ohms" position, as shown in FIGURE 1 to the "AC" position.

Having thus described my invention what I claim is:
1. An electrical measuring instrument comprising:
 (a) a string of transistors, each having base, emitter and collector electrodes;
 (b) means forming a composite connection between adjacent transistors of said string so that the emitter of a preceding transistor is directly connected to the base of the succeeding transistor;
 (c) a source of bias voltage to which the collector electrode of each transistor of said string is connected;
 (d) an input transistor having a base electrode, emitter means, and a collector electrode;
 (e) means connecting the emitter means of said input transistor to the base electrode of the first transistor of said string;
 (f) means connecting the collector electrode of said input transistor to the emitter electrode of the last transistor of said string through a source of reference voltage having a polarity which reverse biases the collector-base junction of said input transistor, said reference source including a Zener diode connected in series with constant current source means;
 (g) electrical load means connected to the emitter electrode of said last transistor; and
 (h) means for measuring the current flow in said electrical load means when an electrical signal is applied to the base electrode of said input transistor.
2. An electrical measuring instrument in accordance with claim 1 and provided with:
 (a) a constant voltage source connected at one end to the emitter electrode of said last transistor; and
 (b) resistance means connecting the other end of said constant voltage source to a point defined by the emitter electrode of one transistor of said string and the base electrode of the transistor succeeding said one transistor to provide a constant current bias in all the transistors of said string succeeding said one transistor;
 (c) said constant voltage source and said resistance means being such that said current bias is larger than the leakage current in all of the transistors of said string succeeding said one transistor.
3. An electrical measuring instrument in accordance with claim 1 and provided with:
 (a) variable resistance means connected to the emitter electrode of said last transistor; and
 (b) a semi-conductor diode having a temperature characteristic substantially the same as the collector-base junction of said first transistor, and connected between said variable resistance means and said input terminal; and
 (c) said variable resistance means being adjustable to counteract the leakage current flowing in the base circuit of said input transistor.

References Cited by the Examiner
UNITED STATES PATENTS

| 2,794,076 | 5/1957 | Shea | 330—32 |
| 2,942,200 | 6/1960 | Hanel | 330—26 |
| 2,979,667 | 4/1961 | Paschal | 330—32 |
| 2,994,834 | 8/1961 | Jones | 330—32 |
| 3,009,113 | 11/1961 | Stanton | 330—28 |
| 3,073,969 | 1/1963 | Skillen | 330—40 |

WALTER L. CARLSON, *Primary Examiner.*

FREDERICK M. STRADER, *Examiner.*

D. R. GREENE, J. J. MULROONEY,
 *Assistant Examiners.*